United States Patent
Kudo et al.

(10) Patent No.: US 7,078,864 B2
(45) Date of Patent: Jul. 18, 2006

(54) DISPLAY APPARATUS AND POWER SUPPLY DEVICE FOR DISPLAYING

(75) Inventors: Yasuyuki Kudo, Kamakura (JP); Akihito Akai, Yokohama (JP); Kazuo Ookado, Kokubunji (JP); Kazunari Kurokawa, Mobara (JP); Atsuhiro Higa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 25 days.

(21) Appl. No.: 10/832,296

(22) Filed: Apr. 27, 2004

(65) Prior Publication Data

US 2004/0207329 A1 Oct. 21, 2004

Related U.S. Application Data

(63) Continuation of application No. 10/161,736, filed on Jun. 5, 2002, now Pat. No. 6,762,565.

(30) Foreign Application Priority Data

Jun. 7, 2001 (JP) ........................ 2000-171888

(51) Int. Cl.
*G09G 3/10* (2006.01)
*G05F 1/00* (2006.01)

(52) U.S. Cl. ............................... 315/169.1; 315/169.3; 315/167; 315/350; 315/196; 315/351

(58) Field of Classification Search ............. 315/169.1, 315/169.3, 167, 196, 350–351, 169.2; 345/96, 345/87, 94, 98, 92, 100, 204–206
See application file for complete search history.

(56) References Cited

U.S. PATENT DOCUMENTS

| 5,477,234 | A | * | 12/1995 | Suzuki et al. ................. 345/95 |
| 5,581,274 | A | | 12/1996 | Tagawa |
| 5,798,741 | A | | 8/1998 | Kajihara |
| 5,877,736 | A | | 3/1999 | Imajo et al. |
| 6,127,995 | A | * | 10/2000 | Furuhashi et al. ............. 345/96 |
| 6,181,313 | B1 | | 1/2001 | Yokota et al. |
| 6,331,844 | B1 | * | 12/2001 | Okumura et al. ............. 345/87 |
| 6,590,553 | B1 | * | 7/2003 | Kimura et al. ................ 345/92 |
| 6,653,999 | B1 | | 11/2003 | Motegi et al. |
| 2002/0008688 | A1 | * | 1/2002 | Yamamoto et al. ........... 345/98 |
| 2002/0063874 | A1 | | 5/2002 | Chiang |

FOREIGN PATENT DOCUMENTS

| JP | 6-51274 | 2/1994 |
| JP | 6-222328 | 8/1994 |
| JP | 10-301087 | 11/1998 |
| JP | 2001-13930 | 1/2001 |

* cited by examiner

*Primary Examiner*—Don Wong
*Assistant Examiner*—Chuc Tran
(74) *Attorney, Agent, or Firm*—Antonelli, Terry, Stout and Kraus, LLP.

(57) ABSTRACT

A power supply device for displaying includes a set register for setting an amplitude and voltage level of a driving voltage for a common electrode and an amplitude and voltage level of a non-selecting period voltage for a scan line, an amplitude reference generating circuit for generating an amplitude reference voltage for the driving voltage of the common electrode and for the non-selecting period voltage of the scan line according to a set value, a VcomH reference generating circuit and a VcomL generating circuit for A.C. driving the common electrode with an amplitude and voltage level determined by the amplitude reference voltage and set value, a VgoffH generating circuit and a VgoffL reference generating circuit for generating the non-selecting period voltage of the scan line with an amplitude and voltage level determined by the amplitude reference voltage and set value.

22 Claims, 12 Drawing Sheets

DISPLAY APPARATUS AND POWER SUPPLY DEVICE FOR DISPLAYING

CROSS-REFERENCE TO RELATED APPLICATIONS

This application is a continuation of application Ser. No. 10/161,736 filed on Jun. 5, 2002 now U.S. Pat. No. 6,762,565. The contents of application Ser. No. 10/161,736 are hereby incorporated herein by reference in their entirety.

BACKGROUND OF THE INVENTION

The present invention relates to display apparatuses each having a power supply device and power supply circuits for supplying power to the display apparatuses and more particular, to a display apparatus using a liquid crystal display of a thin film transistor (TFT) type, a liquid crystal display using low temperature polysilicon, organic electronic luminescence (EL), or plasma and to a driving circuit for displaying.

JP-A-10-301087 discloses that a common electrode driving means supplies an A.C. driving voltage to a common electrode as a common driving voltage to A.C. drive the common electrode, a non-selecting period voltage generator generates a non-selecting period voltage in phase with and having the same amplitude as the A.C. driving voltage, and the non-selecting period voltage generator is connected in series with the common driving means to current-amplify and output a voltage dropped by a predetermined level from an A.C. driving voltage as an output of the common driving means. And a common driver includes an operational amplifier to which an A.C. signal is applied, and a buffer circuit having NPN and PNP transistors; while a gate-off voltage generator includes a level shift circuit having a resistor and a Zener diode and a buffer circuit having an operational amplifier and NPN and PNP transistors. Also disclosed in the above literature is that the gate-off voltage generator shifts an output voltage of the common driver at the level shift circuit and current-amplifies the shifted voltage at the buffer circuit.

Also disclosed in U.S. Pat. No. 5,877,736 is that a gate-on voltage generating circuit includes a level shift circuit having a constant current source and a Zener diode and a buffer circuit having an operational amplifier and NPN and PNP transistors, the level shift circuit shifts an output voltage of a common driver, the buffer circuit amplifies the shifted voltage, a gate-off voltage generating circuit includes a level shift circuit having a constant current source and a Zener diode and a buffer circuit having an operational amplifier and NPN and PNP transistors, the level shift circuit shifts the output voltage of the common driver, and the buffer circuit amplifies the shifted voltage. Further disclosed in the above publication is that the waveform of a common voltage Vcom, the on-level waveform of a gate voltage, and the off-level waveform of the gate voltage are different in D.C. level but have the same shape, and thus that the waveform of the common voltage Vcom, on-level and off-level waveforms of the gate voltage can be obtained by generating one of these waveforms and by level shifting the generated waveform to form the other two waveforms. Also disclosed in the Publication is that a variable resistor is used to change the amplitude of the common voltage of an A.C. driving waveform generated by a common voltage generator. Additionally disclosed in the Publication is that a semi-fixed resistor is used to adjust the D.C. level of the common signal voltage.

In the conventional power supply device, however, a current constantly flows from the common voltage through the Zener diode, thus resulting in a high power consumption. Further, in order to change of the voltage amplitude or level of the common voltage and gate-off voltage according to the TFT liquid crystal panel used, it is required to change the value of each resistor or to replace parts such as the Zener diode. In addition, an increased number of parts are required, which is disadvantageous from the cost viewpoint.

SUMMARY OF THE INVENTION

It is therefore an object of the present invention to provide a display apparatus and a power supply device for a display which can reduce the power consumption of a liquid crystal display apparatus. Another object of the present invention is to provide a display apparatus and a display supply device for a display, which can improve user's convenience by facilitating change of the amplitude or voltage level of a power supply voltage.

The present invention includes a set value holding circuit for setting the amplitude and voltage level of a drive voltage of a common electrode and the amplitude and voltage level of a non-selecting period voltage of a scan line in a display apparatus, an amplitude reference voltage generating circuit for generating an amplitude reference voltage for both of the driving voltage for the common electrode and the non-selecting period voltage of the scan line according to the set value, a common electrode driving circuit for A.C. driving the common electrode with the amplitude and voltage level determined by the amplitude reference voltage and set value, and a non-selecting period voltage generating circuit for generating a non-selecting period voltage of the scan line with the amplitude and voltage level determined by the amplitude reference voltage and set value.

Further the present invention includes a set value holding circuit for setting the voltage level of a driving voltage for a common electrode and the voltage level of a non-selecting period voltage of scan line in a display apparatus, a common electrode driving circuit for fixing one potential of the driving voltage for the common electrode and generating the other potential according to the set value, and a non-selecting period voltage generating circuit for generating one potential of the non-selecting period voltage of the scan line according to the set value and generating the other potential from a potential difference of the driving voltage for the common electrode.

Other objects, features and advantages of the invention will become apparent from the following description of the embodiments of the invention taken in conjunction with the accompanying drawings.

DETAILED DESCRIPTION OF THE EMBODIMENTS

Figure 1:
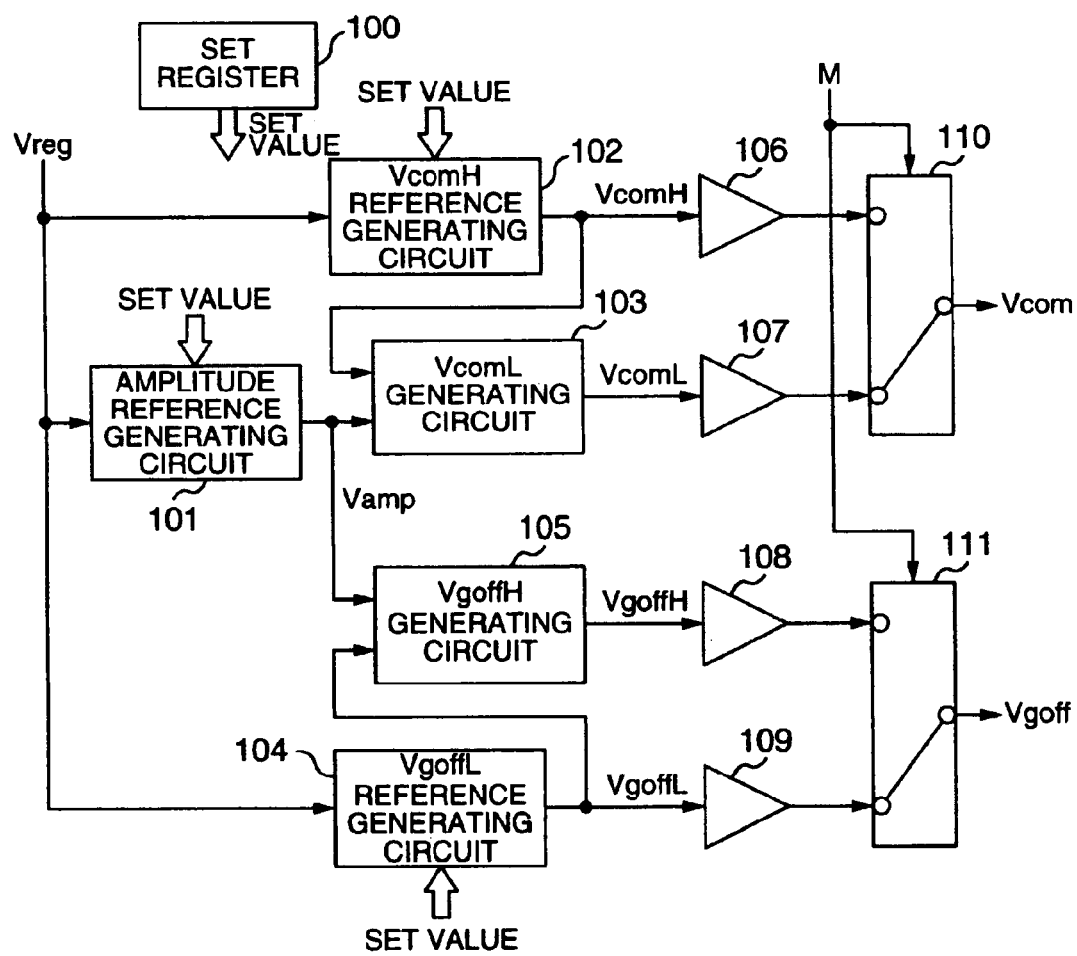
FIG. 1 schematically shows an arrangement of a power supply device in accordance with a first embodiment of the present invention.
Figure 2:
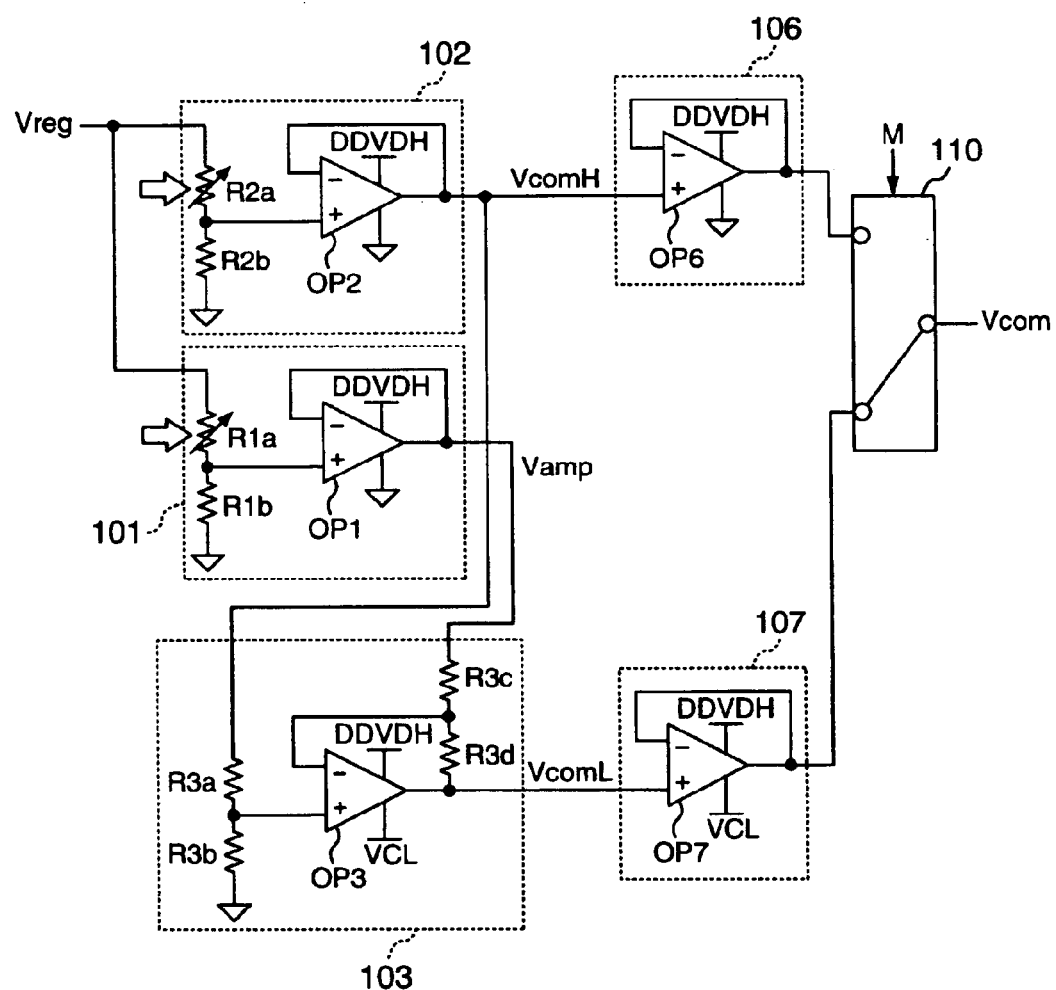
FIG. 2 shows a detailed structure of a circuit for generating a common voltage Vcom in the power supply device in accordance with the first embodiment of the present invention.
Figure 3:
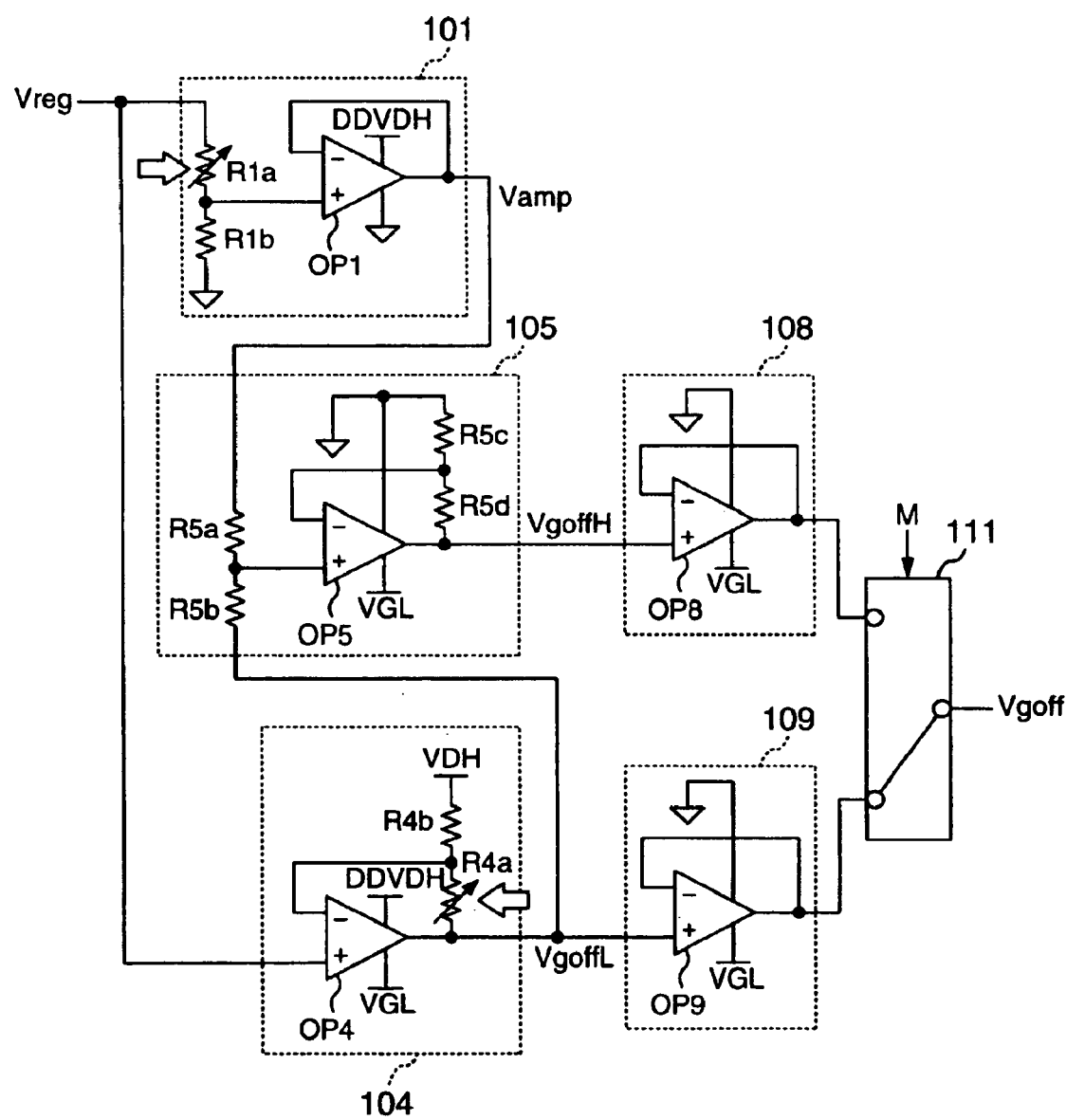
FIG. 3 shows a detailed structure of a circuit for generating a gate-off voltage Vgoff in the power supply device in accordance with the first embodiment of the present invention.

Embodiment 1:

Explanation will be made as to the arrangement and operation of a power supply device in accordance with a first embodiment of the present invention with reference to FIGS. 1 to 3.

By referring first to FIG. 1, the entire arrangement of the power supply device of the present embodiment will be explained. The power supply device of the present embodiment includes a set register 100 for holding a set value, an amplitude reference generating circuit 101 for generating a voltage Vamp according to the set value from a reference voltage Vreg, a VcomH reference generating circuit 102 for generating a voltage VcomH according to the set value from the reference voltage Vreg, a VcomL generating circuit 103 for generating a voltage VcomL from the VcomH and Vamp, a VgoffL reference generating circuit 104 for generating a voltage VgoffL according to the set value from the reference voltage Vreg, a VgoffH generating circuit 105 for generating a voltage VgoffH from the VgoffL and Vamp, buffers 106 to 109 for receiving and current-amplifying the VcomH, VcomL, VgoffH and VgoffL, a voltage selector 110 for switching between the VcomH and VcomL according to an A.C. signal M to generate a common voltage Vcom, and a voltage selector 111 for switching between the VgoffH and VgoffL according to the A.C. signal M.

Explanation will next be made as to the operation of the power supply device of the present embodiment. First, the set register 100 has the set value held therein for determining output voltages of the amplitude reference generating circuit 101, VcomH reference generating circuit 102 and VgoffL generating circuit 104. When the set value is changed, the output voltages of the respective circuits are varied according to the changed set value. The amplitude reference generating circuit 101 generates the voltage Vamp as the reference voltage of the VcomL generating circuit 103 and VgoffH generating circuit 105 according to the set value with the reference voltage Vreg as a reference to determine the voltage amplitude of the common voltage Vcom and gate-off voltage Vgoff. The VcomH reference generating circuit 102 generates a voltage VcomH as a higher potential voltage of the common voltage Vcom according to the set value with the reference voltage Vreg as a reference. The VcomL generating circuit 103 generates a voltage VcomL as a lower potential voltage of the common voltage Vcom according to the Vamp with the VcomH as a reference. The VcomH and VcomL are current-amplified by the buffers 106 and 107 so that a sufficient current can be supplied to the common electrode of the TFT liquid crystal panel to drive the electrode. The VcomH and VcomL amplified by the buffers 106 and 107 are applied to the voltage selector 110, and switched to one according to the A.C. signal M, so that the one voltage is output as the common voltage Vcom. Assume, for example, that, when the A.C. signal M is at its low level, the driving voltage of the liquid crystal panel has a positive polarity. Then the voltage selector 110 selects and outputs the VcomL. The VgoffL reference generating circuit 104 generates a voltage VgoffL as a lower potential voltage of the gate-off voltage Vgoff according to the set value with the reference voltage Vreg as a reference. The VgoffH generating circuit 105 generates a voltage VgoffH as a higher potential voltage of the gate-off voltage Vgoff according to the Vamp with the VgoffL as a reference. In this connection, the voltage VgoffH is set so that a potential difference from the VgoffL becomes equal to the amplitude of the common voltage Vcom. The VgoffH and VgoffL are current-amplified by the buffers 108 and 109 so that a sufficient current can be supplied to a gate electrode of the TFT liquid crystal panel to drive the gate electrode. The VgoffH and VgoffL amplified by the buffers 108 and 109 are applied to the voltage selector 111, and switched to one according to the A.C. signal M, so that the one voltage is output as the gate-off voltage Vgoff. Assume, for example, that, when the A.C. signal M is at its low level, the driving voltage of the liquid crystal panel has a positive polarity. Then the voltage selector 111 selects and outputs the VgoffL. Accordingly, the common voltage Vcom and gate-off voltage Vgoff become in phase with each other and have voltage waveforms having an identical amplitude.

By referring next to FIG. 2, a circuit for generating a common voltage Vcom in the power supply device of the present embodiment will be explained in detail in connection with a specific example. In FIG. 2, the amplitude reference generating circuit 101 has an operational amplifier OP1, a variable resistor R1a and a resistor R1b. The VcomH reference generating circuit 102 has an operational amplifier OP2, a variable resistor R2a and a resistor R2b. The VcomL generating circuit 103 has an operational amplifier OP3, resistors R3a and R3d. The buffer 106 has an operational amplifier OP6. The buffer 107 has an operational amplifier OP7. In this connection, since the VcomH is set usually at a voltage value in the vicinity of a positive power supply voltage DDVDH, a positive power level of the OP2 and OP6 is set at the power supply voltage DDVDH and a negative power level thereof is set at the ground GND. Further, since the VcomL is usually set at a voltage value in the vicinity of the ground GND, a positive power level of the OP3 and OP7 is set at the power supply voltage DDVDH and a negative power level thereof is set at a power supply voltage VCL. In addition, the positive power level of the OP1 for generating the voltage Vamp associated with the voltage amplitude is set at the power supply voltage DDVDH, and the negative power level thereof is set at the ground GND.

In the amplitude reference generating circuit 101, the reference voltage Vreg is divided by the variable resistor R1a and resistor R1b to obtain a voltage, the obtained voltage is applied to the operational amplifier OP1 formed as a voltage follower for its buffering to generate the voltage Vamp. The variable resistor R1a is a so-called volume resistor of an electronic type which is made up of a resistor and an MOS switch and which can change its resistive value by the set value of the set register 100. In the VcomH reference generating circuit 102, the reference voltage Vreg is divided by the variable resistor R2a and resistor R2b to obtain a voltage, and the divided voltage is applied to the operational amplifier OP2 formed as a voltage follower for its buffering to generate the voltage VcomH. Like the variable resistor R1a, the resistive value of the variable resistor R2a can be changed by the set value of the set register 100. The VcomL generating circuit 103, which forms a differential amplifier, generates the voltage VcomL from the voltage VcomH and voltage Vamp.

The voltage VcomL is expressed by an equation which follows.

$$VcomL = A \cdot VcomH - B \cdot Vamp \qquad (1)$$

Where, $A = \{(R3c+R3d) \cdot R3b\}/\{(R3a+R3b) \cdot R3d\}$, and $B = R3c/R3d$.

In the buffer 106, the operational amplifier OP6 formed as a voltage follower buffers the voltage VcomH. In the buffer 107, the operational amplifier OP7 formed as a voltage follower buffers the voltage VcomL. As mentioned above, the voltage VcomL can be generated from the voltage VcomH and voltage Vamp, and the voltage VcomH and voltage Vamp can be controlled according to the set value to easily adjust the amplitude and voltage level of the common voltage Vcom.

In order for the amplitude of the common voltage Vcom to be generated only by the setting of the voltage Vamp not by the setting of the voltage VcomH, conditions R3a=R3c and R3b=R3d are required to be satisfied. Substituting the conditions into the equation (1) results in an equation (2).

$$VcomH - VcomL = (R3a/R3b) \cdot Vamp \qquad (2)$$

That is, the amplitude of the common voltage Vcom is proportional to the voltage Vamp.

Explanation will now be made as to the value of the voltage VcomL. The voltage VcomL, which is determined by a product of the(R3a/R3b) and voltage Vamp, takes a value in the vicinity of the ground GND. Since the positive power level of the operational amplifiers OP3 and OP7 are set at the power supply voltage DDVDH and the negative power level is set at the negative power supply voltage VCL, the voltage VcomL can be set at any one of the negative voltage, ground GND and positive voltage.

Explanation will be made in detail as to a circuit for generating a gate-off voltage Vgoff in the power supply device of the present embodiment in connection with a specific example, by referring to FIG. 3. In FIG. 3, the VgoffL reference generating circuit 104 has an operational amplifier OP4, a variable resistor R4a and a resistor R4b. The VgoffH generating circuit 105 has an operational amplifier OP5 and resistors R5a to R5d. A buffer 108 has an operational amplifier OP8. A buffer 109 has an operational amplifier OP9. In this connection, the voltage VgoffH and voltage VgoffL are assumes to be set at values in a range from the ground GND to a negative power voltage VGL.

In the VgoffL reference generating circuit 104, the operational amplifier OP4 generates the voltage VgoffL in such a manner that a voltage obtained by dividing the voltage obtained from VgoffL and positive power supply voltage DDVDH by means of the variable resistor R4a and resistor R4b becomes equal to the reference voltage Vreg. The resistive value of the variable resistor R4a can be changed by the set value of the set register 100, like the variable resistor R1a. The VgoffH generating circuit 105, which forms a differential amplifier, generates the voltage VgoffH from the voltage VgoffL and voltage Vamp. The voltage VgoffH is expressed by an equation which follows.

$$VgoffH = C \cdot VgoffL + D \cdot Vamp \qquad (3)$$

Where, $C = \{(R4c+R4d) \cdot R4a\}/\{(R4a+R4b) \cdot R4c\}$, and $D = R4b/R4c$.

In the buffer 108, the operational amplifier OP8 formed as a voltage follower buffers the voltage VgoffH. In the buffer 109, the operational amplifier OP9 formed as a voltage follower buffers the voltage VgoffL. As mentioned above, the voltage VgoffH can be generated from the voltage VgoffL and voltage Vamp, and the voltage VgoffL and voltage Vamp can be controlled according to the set value to easily adjust the amplitude and voltage level of the gate-off voltage Vgoff.

In order that the amplitude of the gate-off voltage Vgoff is generated only by the setting of the voltage Vamp not by the setting of the voltage VgoffL, conditions R4a=R4c and R4b=R4d are required to be satisfied. Substituting the conditions into the equation (3) gives:

$$VgoffH - VgoffL = (R4b/R4a) \cdot Vamp \qquad (4)$$

That is, the amplitude of the gate-off voltage Vgoff is proportional to the voltage Vamp.

Further, in order that the amplitude of the common voltage Vcom is equal to that of the gate-off voltage Vgoff, a condition (R3a/R3b)=(R4b/R4a) is required to be satisfied.

Accordingly, when a ratio between the resistors is selected so as to satisfy all the conditions mentioned above, the voltage VcomH and voltage VgoffL can be set to determine the reference potentials of the common voltage Vcom and the gate-off voltage Vgoff; and further voltage Vamp can be set to generate the common voltage Vcom and gate-off voltage Vgoff that are in phase with each other and have the same amplitude.

As has been explained above, with use of the set values of the amplitude reference generating circuit, VcomH reference generating circuit and VgoffL reference generating circuit; the common voltage Vcom and gate-off voltage Vgoff which are in phase with each other and have the same amplitude can be easily generated.

Further, since the power supply device of the present embodiment can be implemented with use of the resistors, operational amplifiers, etc., the power supply device can be made in the form of an IC, thus reducing the number of necessary parts.

In addition, each voltage level and amplitude is determined based on the resistance ratio, so that, when the resistance value is made high, a stationary current can be suppressed and the power consumption can be reduced to a low level.

In the foregoing, the power supply device according to the first embodiment has been explained. Explanation will then be made as to how to reduce the circuit scale and power consumption of the power supply device of the second embodiment.

Embodiment 2:

A power supply device in accordance with a second embodiment of the present invention will be explained with reference to FIGS. 4 and 5. The present embodiment is featured in that the voltage VcomL is fixed, and is different from the first embodiment in how to determine the amplitudes of the common voltage Vcom and gate-off voltage Vgoff in the power supply device of the first embodiment.

Figure 4:
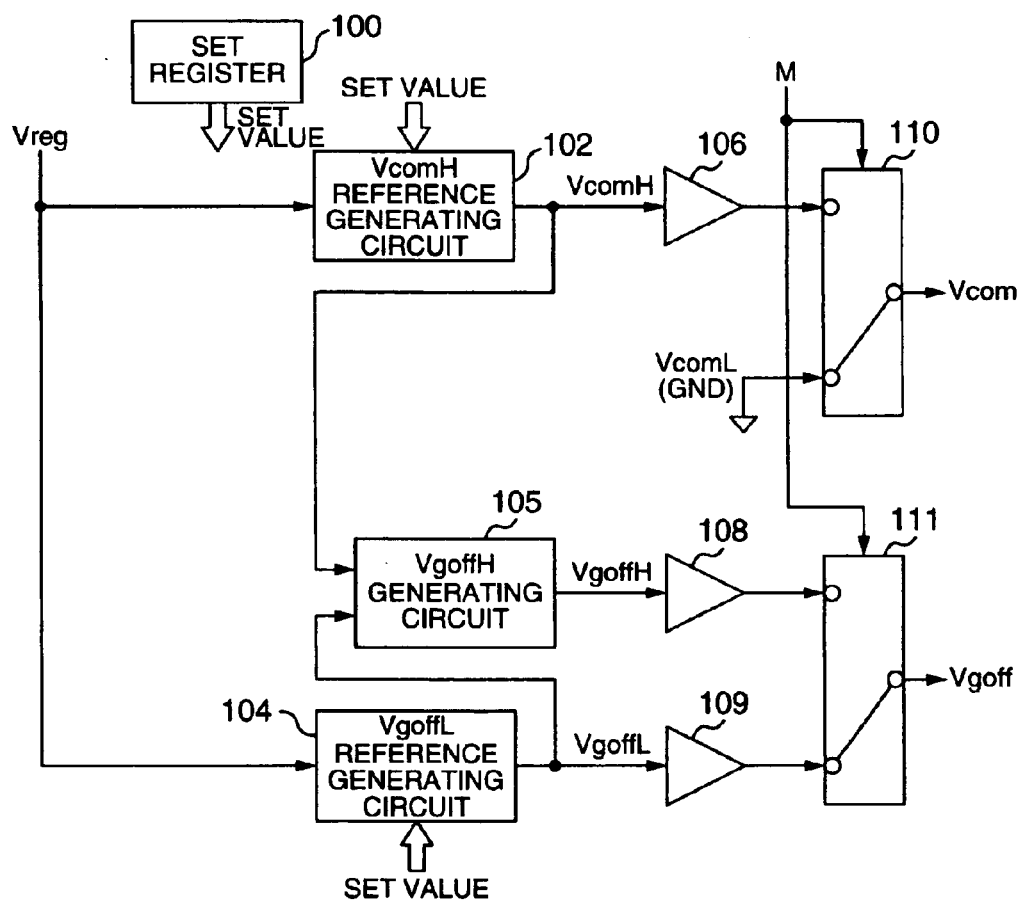
FIG. 4 schematically shows an arrangement of a power supply device in accordance with a second embodiment of the present invention.
Figure 5:
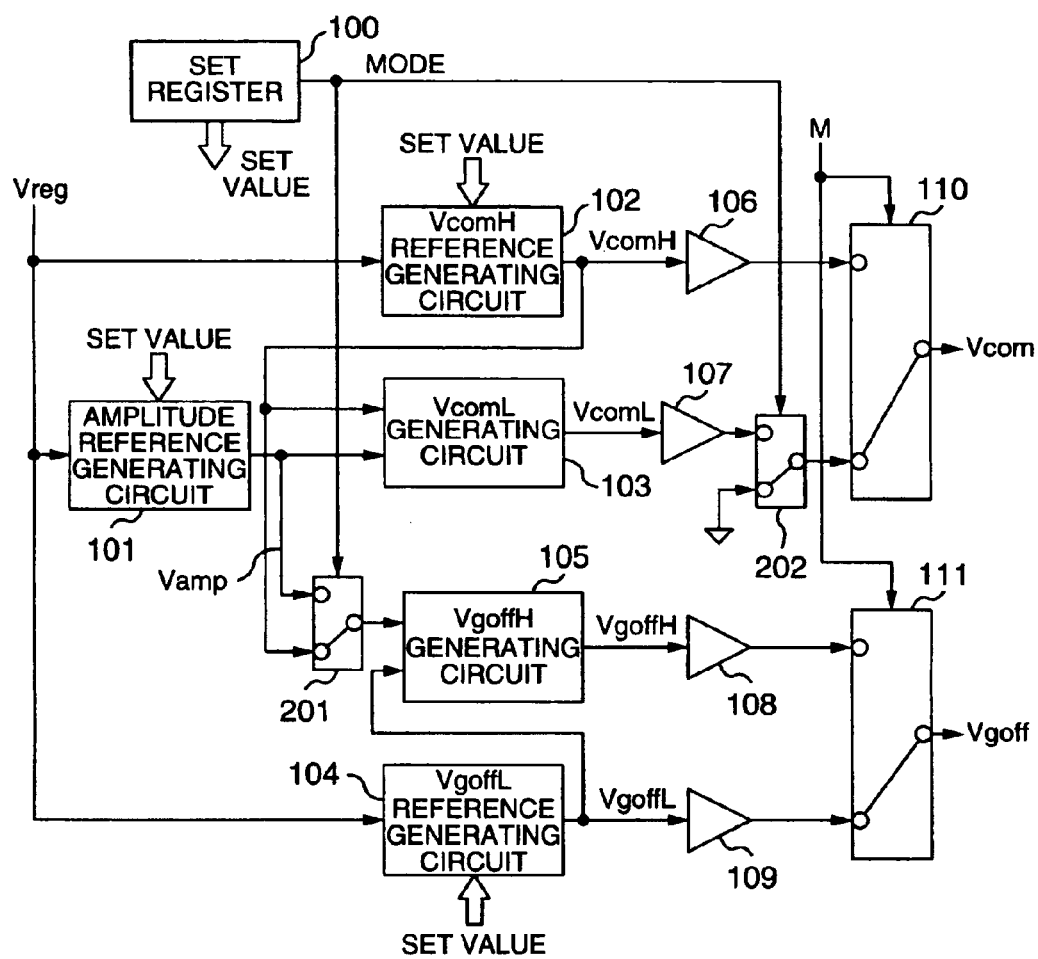
FIG. 5 schematically shows another arrangement of the power supply device in accordance with the second embodiment of the present invention.

In FIG. 4, the voltage VcomL is fixed at the ground GND and the voltage VcomH is generated by the VcomH reference generating circuit 102 as in the power supply device of the first embodiment. Like the power supply device of the first embodiment, the voltage VgoffL is generated by the VgoffH generating circuit 105. The voltage VgoffH is generated by applying the voltage VcomH and voltage VgoffL to the VgoffH generating circuit. That is, in place of the voltage Vamp applied to the VgoffH generating circuit in the power supply device of the first embodiment, the voltage VcomH is applied thereto. The specific interior structures of component circuits are the same as those of the power supply device of the first embodiment. Accordingly, the voltage VgoffH is expressed by an equation which follows.

$$VgoffH = C \cdot VgoffL + D \cdot VcomH \quad (5)$$

Where, $C = \{(R4c + R4d) \cdot R4a\} / \{(R4a + R4b) \cdot R4c\}$, and $D = R4b/R4c$.

In this connection, in order that the amplitude of the gate-off voltage Vgoff is generated only by the setting of the voltage VcomH not by the setting of the voltage VgoffL, a condition of $R4a = R4c = R4b = R4d$ is required to be satisfied. Substituting the condition into the equation (5) results in:

$$VgoffH - VgoffL = VcomH \quad (6)$$

Thus, when the voltage VcomL is fixed to the ground GND, the resistive values of resistors in the VgoffH generating circuit are set to be all the same to set the voltage VcomH and voltage VgoffL, whereby the common voltage Vcom and gate-off voltage Vgoff in phase with each other and having the same amplitude can be generated.

Further, the power supply device of the present embodiment can be made smaller in circuit scale and power consumption than the power supply device of the first embodiment.

Explanation will next be made as to a power supply device which can switchingly use one of the power supply device of the first embodiment and the power supply device shown in FIG. 4, by referring to FIG. 5. In FIG. 5, the power supply device of the present embodiment includes a voltage selector 201 for switchingly selecting one of the voltage Vamp and voltage VcomH according to a switching signal MODE and applying the selected voltage to the gate-off voltage VgoffH generating circuit 105, and a voltage selector 202 for switchingly selecting one of the voltage VcomL amplified by the buffer 107 and the ground GND according to the switching signal MODE and applying the selected voltage to the voltage selector 110. In this connection, the resistive values of resistors in the VgoffH generating circuit are set to be all the same. That is, a relationship of $R4a = R4c = R4b = R4d$ is satisfied. When the voltage VcomL is fixed to the ground GND, a power consumption can be reduced by turning OFF the amplitude reference generating circuit 101, VcomL generating circuit 103 and buffer 107 respectively.

As has been explained above, when the voltage VcomL is fixed to the ground GND, the power consumption can be made low, and the common voltage Vcom and gate-off voltage Vgoff in phase with each other and having the same amplitude can be easily generated with use of the set values of the amplitude reference generating circuit, VcomH reference generating circuit and VgoffL reference generating circuit.

The power supply device of the second embodiment has been explained in the foregoing. Explanation will next be made as to a power supply device in accordance with a third embodiment in connection with a case where, even when a reference voltage is changed, a common voltage Vcom and a gate-off voltage Vgoff in phase with each other and having the same amplitude can be similarly easily generated.

Figure 6:
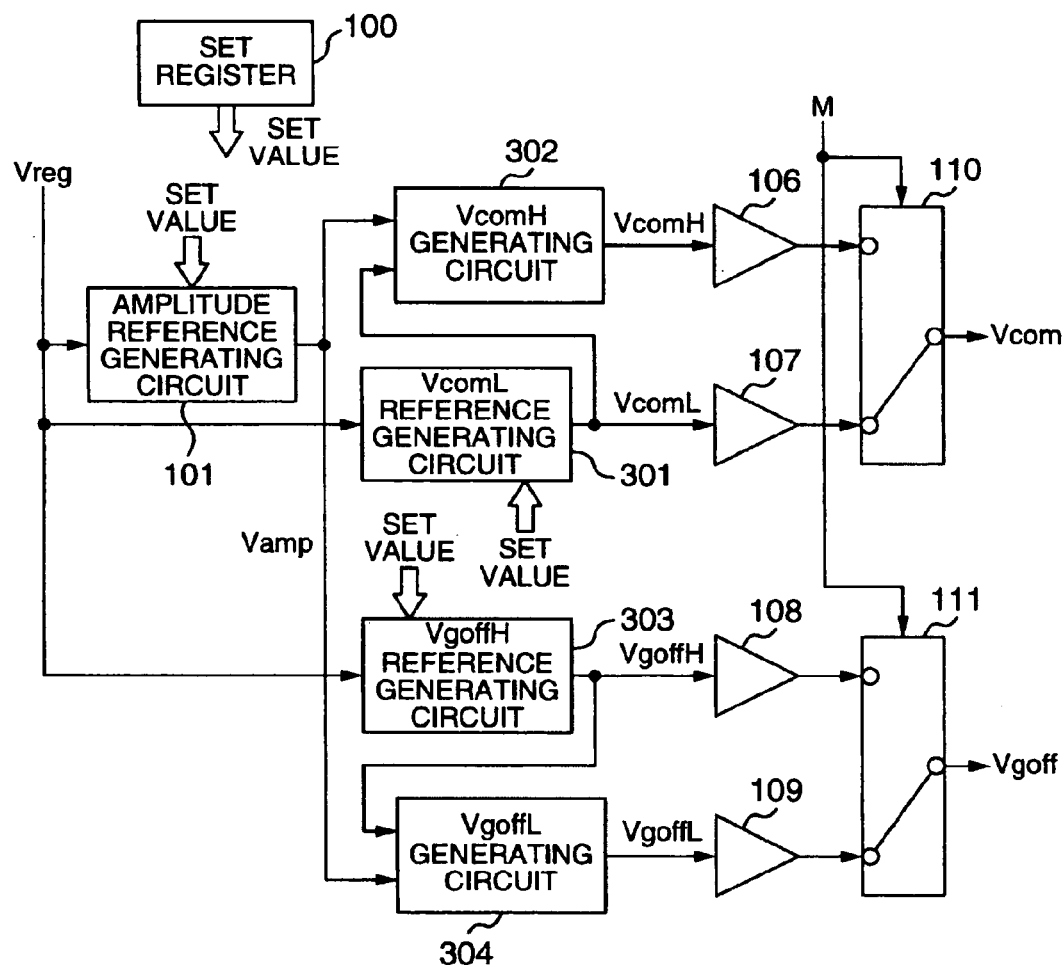
FIG. 6 schematically shows an arrangement of a power supply device in accordance with a third embodiment of the present invention.
Figure 7:
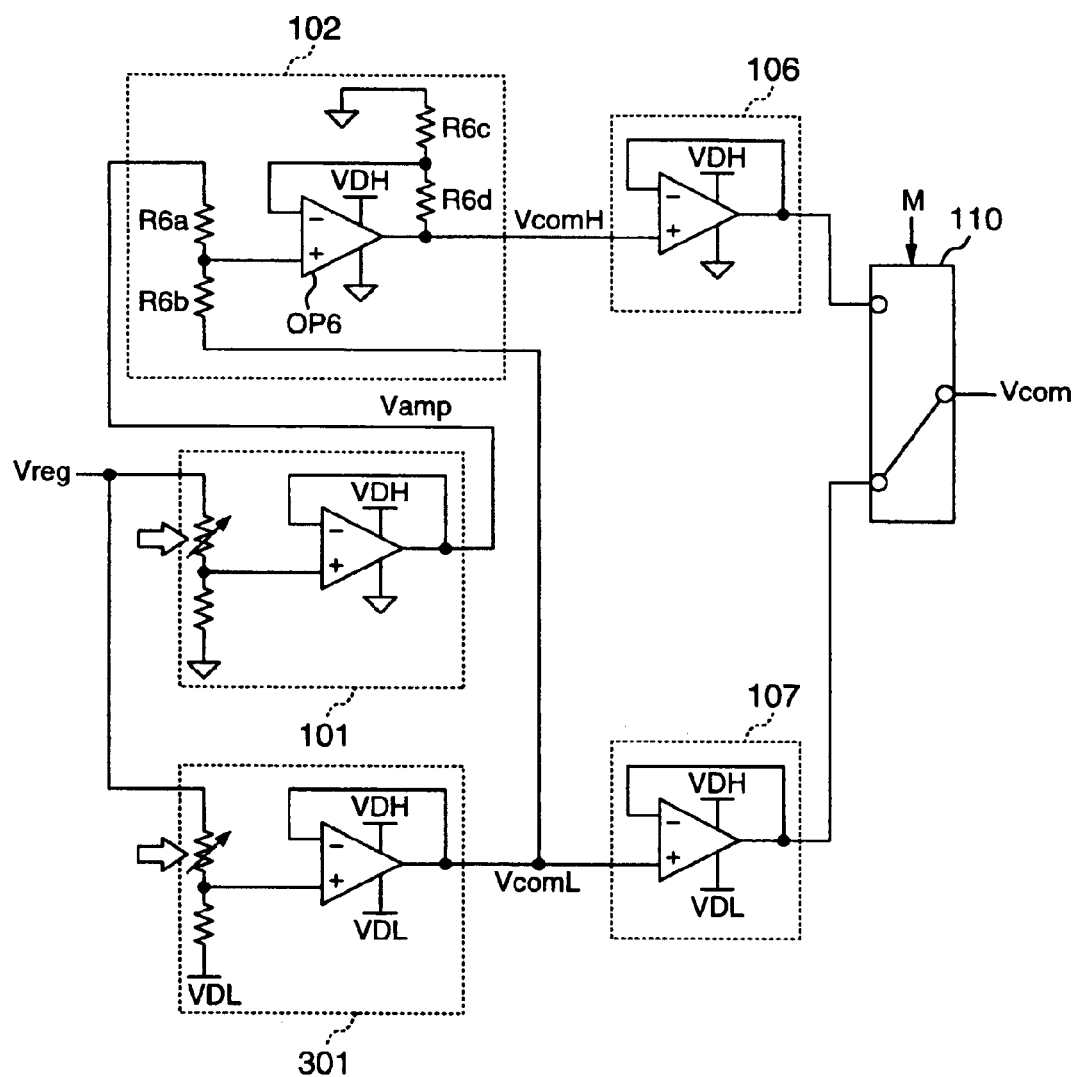
FIG. 7 shows a detailed structure of a circuit for generating a common voltage Vcom in the power supply device in accordance with the third embodiment of the invention.
Figure 8:
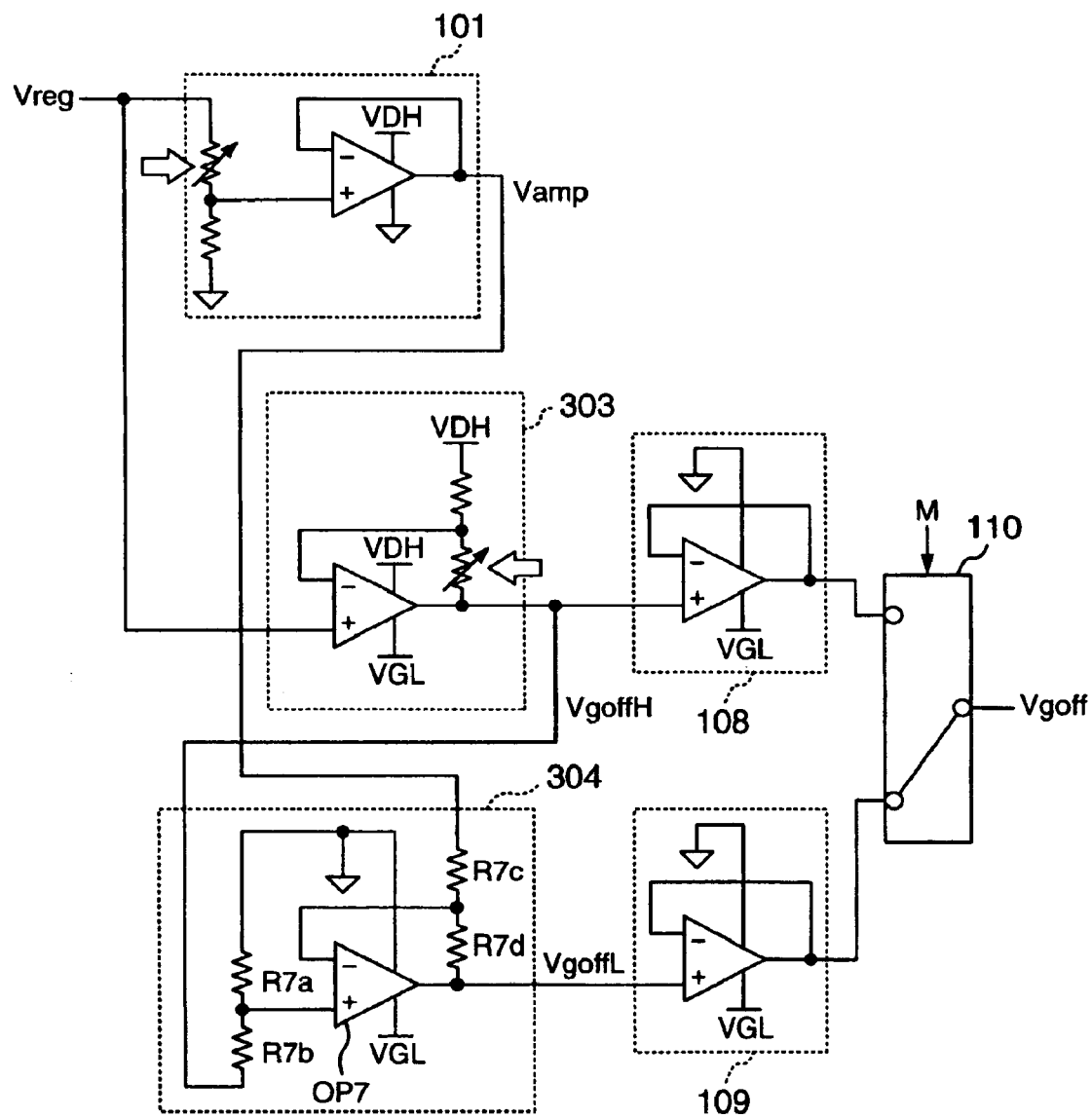
FIG. 8 shows a detailed structure of a circuit for generating a gate-off voltage Vgoff in the power supply device in accordance with the third embodiment of the invention.

Embodiment 3:

Explanation will be made as to a power supply device in accordance with a third embodiment of the present invention, with reference to FIGS. 6 to 8. The entire arrangement of the power supply device of the present embodiment will be explained by referring first to FIG. 6.

The power supply device of the present embodiment includes a set register 100 for holding a set value therein, an amplitude reference generating circuit 101 for generating a voltage Vamp according to the set value from a reference voltage Vreg, a VcomL reference generating circuit 301 for generating a voltage VcomL according to the set value from the reference voltage Vreg, a VcomH generating circuit 302 for generating a voltage VcomH from the voltage VcomL and voltage Vamp, a VgoffH reference generating circuit 303 for generating a voltage VgoffH according to the set value from the reference voltage Vreg, a VgoffL generating circuit 304 for generating a voltage VgoffL from the voltage VgoffH and voltage Vamp, buffers 106 to 109 for receiving and current-amplifying the voltage VcomH, voltage VcomL, voltage VgoffH and voltage VgoffL, a voltage selector 110 for switchingly selecting one of the voltage VcomH and voltage VcomL according to an A.C. signal M to generate a common voltage Vcom, and a voltage selector 111 for switchingly selecting one of the voltage VgoffH and voltage VgoffL according to the A.C. signal M to generate a gate-off voltage Vgoff.

Explanation will then be made as to the operation of the power supply device of the present embodiment. The amplitude reference generating circuit 101 generates a voltage Vamp as a reference voltage of the VcomH generating circuit 302 and VgoffL generating circuit 304 according to the set value with the reference voltage Vreg as a reference and determines the voltage amplitude of the common voltage Vcom and gate-off voltage Vgoff. The VcomL reference generating circuit 301 generates a voltage VcomL as the lower potential voltage of the common voltage Vcom according to the set value with the reference voltage Vreg as a reference. The VcomH generating circuit 302 generates a voltage VcomH as the higher potential voltage of the common voltage Vcom according to the voltage Vamp with the voltage VcomL as a reference. The operations of the buffers 106 and 107 and voltage selector 110 are the same as those in the power supply device of the first embodiment. The VgoffH reference generating circuit 303 generates a voltage VgoffH as the higher potential voltage of the gate-off voltage Vgoff according to the set value with the reference voltage Vreg as a reference. The VgoffL generating circuit 304 generates a voltage VgoffL as the lower potential voltage of the gate-off voltage Vgoff according to the voltage Vamp with the voltage VgoffH as a reference. The voltage VgoffL is set so that a potential difference from the voltage VgoffH become the same as the amplitude of the common voltage Vcom. The operations of the buffers 108 and 109 and voltage selector 111 are the same as those in the power supply device of the first embodiment.

Next explanation will be made in detail in connection with a specific example of a circuit for generating a common voltage Vcom in the power supply device of the present embodiment by referring to FIG. 7. In FIG. 7, an amplitude reference generating circuit 101 has the same structure as that in the power supply device of the first embodiment. A VcomL reference generating circuit 301 is the same structure as the VcomH reference generating circuit 102, but is different therefrom in that the voltage VcomL is generated in place of the voltage VcomH. The VcomH generating circuit 302 has an operational amplifier OP10 and resistors R6a to R6d. In this case, since the voltage VcomH is set usually at a value in the vicinity of a positive power supply voltage DDVDH, the positive power level of the operational amplifiers OP2 and OP6 is set at the power supply voltage DDVDH, and the negative power level thereof is set at the ground GND. Further, since the voltage VcomL is set usually at a value in the vicinity of the ground GND, the positive power level of the operational amplifiers OP3 and OP7 is set at the power supply voltage DDVDH and the negative power level thereof is set at the power supply voltage VCL. Further, the positive power level of the operational amplifier OP1 for generating the voltage Vamp associated with the voltage amplitude is set at the power supply voltage DDVDH, and the negative power level is set at the ground GND.

The VcomH generating circuit 302, which forms a differential amplifier, generates a voltage VcomH from the voltage VcomL and voltage Vamp. The voltage VcomH is expressed as follows.

$$VcomH = E \cdot VcomL + F \cdot Vamp \quad (7)$$

Where, $E = \{(R6c + R6d) \cdot R6a\}/\{(R6a + R6b) \cdot R6c\}$, and $F = R6b/R6c$.

As has been mentioned above, the voltage VcomH can be generated from the voltage VcomL and voltage Vamp, and the amplitude and voltage level of the common voltage Vcom can be easily adjusting by controlling the voltage VcomL and voltage Vamp with use of the voltage selector.

In order that the amplitude of the common voltage Vcom is generated only by the setting of the voltage Vamp not by the voltage VcomL, conditions of $R6a = R6c$, $R6b = R6d$ are required to be satisfied. Substituting the conditions into the equation (7) results in:

$$VcomH - VcomL = (R6b/R6a) \cdot Vamp \quad (8)$$

That is, the amplitude of the common voltage Vcom is proportional to the voltage Vamp.

Explanation will next be made in detail in connection with a specific example of a circuit for generating a gate-off voltage Vgoff in the power supply device of the present embodiment, by referring to FIG. 8. In FIG. 8, the VgoffH reference generating circuit 303 has the same structure as the VgoffL reference generating circuit 104 but is different therefrom in that the voltage VgoffH is generated in place of the voltage VgoffL. The VgoffL generating circuit 304 has an operational amplifier OP7 and resistors R7a to R7d. In this connection, the voltage VgoffH and voltage VgoffL are assumed to be set at values in a range from the ground GND to the negative power voltage VGL.

A VgoffL generating circuit 604, which forms a differential amplifier, generates a voltage VgoffL from the voltage VgoffH and voltage Vamp. The voltage VgoffL is expressed as follows.

$$VgoffL = G \cdot VgoffH - H \cdot Vamp \quad (9)$$

Where $G = \{(R7c + R7d) \cdot R7a\}/\{(R7a + R7b) \cdot R7c\}$, and $H = R7d/R7c$.

As has been explained above, the voltage VgoffL can be generated from the voltage VgoffH and voltage Vamp, and the amplitude and voltage level of the gate-off voltage Vgoff can be easily adjusted by controlling the voltage VgoffH and voltage Vamp according to the set value.

In this case, in order that the amplitude of the gate-off voltage Vgoff is generated only by the setting of the voltage Vamp not by the setting of the voltage VgoffH, conditions of $R7a = R7c$ and $R7b = R7d$ are required to be satisfied. Substituting the conditions into the equation (9) results in:

$$VgoffH - VgoffL = (R7b/R7a) \cdot Vamp \quad (10)$$

That is, the amplitude of the gate-off voltage Vgoff is proportional to the voltage Vamp.

Further, in order that the amplitude of the common voltage Vcom is equal to the amplitude of the gate-off voltage Vgoff, a condition of $(R6b/R6a) = (R7b/R7a)$ is required to be satisfied.

Accordingly, when a resistance ratio is selected so as to satisfy all the above conditions, the voltage VcomL and voltage VgoffH can be set to determine the reference potential of the common voltage Vcom and gate-off voltage Vgoff; and further, the voltage Vamp can be set to generate the common voltage Vcom and gate-off voltage Vgoff in phase with each other and having the same amplitude.

As has been explained above, even when the voltage VcomH is generated with the voltage VcomL as a reference and the voltage VgoffL is generated with the voltage VgoffH as a reference, the common voltage Vcom and gate-off voltage Vgoff in phase with each other and having the same amplitude can be easily generated.

In the foregoing, the power supply device of the third embodiment has been explained. Explanation will next be made as to how to easily generate two voltages in phase with each other and having the same amplitude with use of a less number of operational amplifiers in a power supply device in accordance with a fourth embodiment of the present invention.

Figure 9:
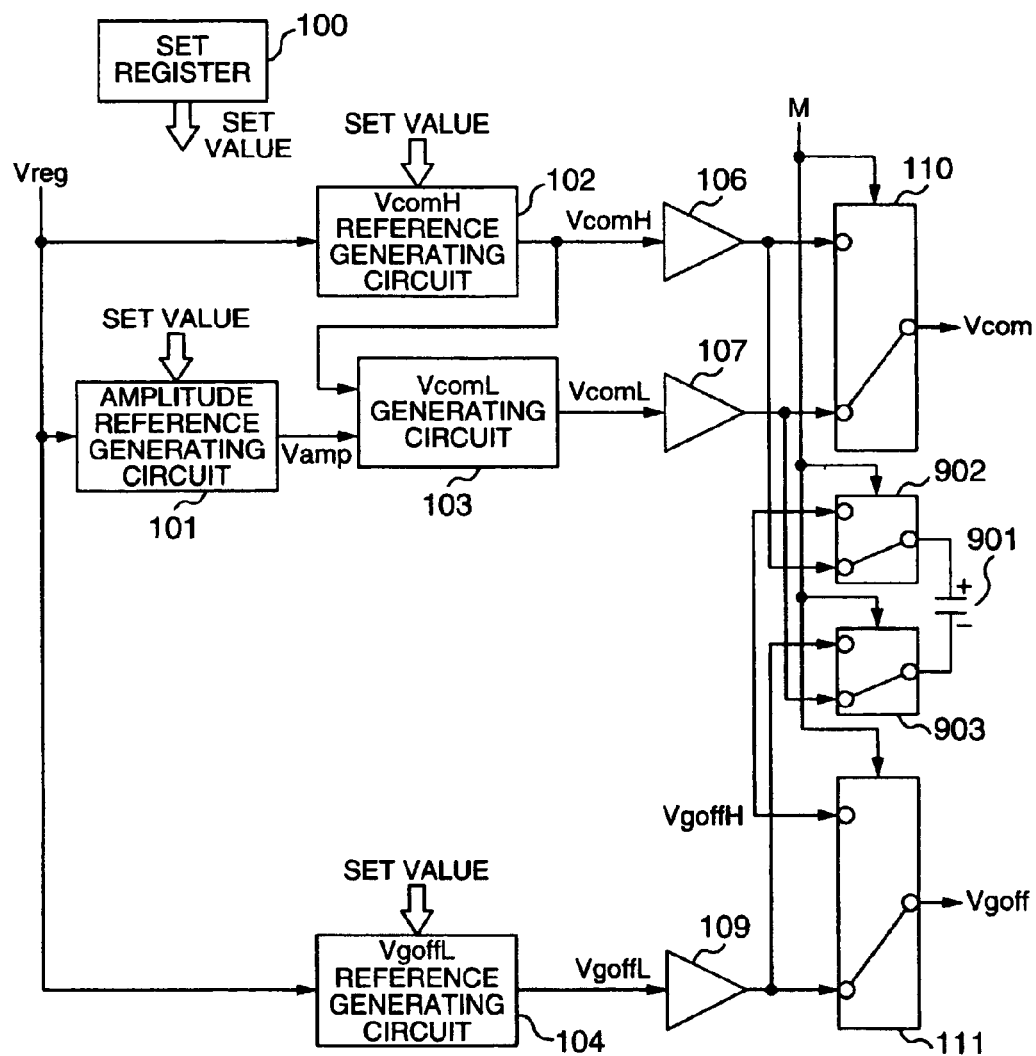
FIG. 9 schematically shows an arrangement of a power supply device in accordance with a fourth embodiment of the present invention.

Embodiment 4:

Explanation will be made as to a power supply device in accordance with a fourth embodiment of the present invention with reference to FIG. 9.

The power supply device of the present embodiment is different from the power supply device of the first embodiment only in the circuit for generating the voltage VgoffH in the first embodiment. As shown in FIG. 9, the power supply device includes a capacitor 901 in place of the VgoffH generating circuit 105 and buffer 108 in the power supply device of the first embodiment, a voltage selector 902 for switching selecting one of the voltage VcomH amplified by the buffer 106 and the voltage VgoffH connected to the voltage selector according to the A.C. signal M and supplying the selected voltage to a plus electrode of the capacitor 901, and a voltage selector 903 for switchingly selecting one of the voltage VcomL amplified by the buffer 107 and the voltage VgoffL amplified by the buffer 109 according to the A.C. signal M and supplying the selected voltage to a minus electrode of the capacitor 901.

The operation of the power supply device of the present embodiment will then be explained. In this case, when the A.C. signal M is at its low level, the driving voltage of the liquid crystal panel has a positive polarity and the voltage selectors 110 and 111 select and output the voltage VcomL and voltage VgoffL respectively. At this time, the voltage selector 902 connects the plus electrode of the voltage selector 902 with the voltage VcomH, and the voltage selector 903 connects the minus electrode of the voltage selector 902 with the voltage VcomL to charge the capacitor 901. When the capacitor 901 is sufficiently charged, a potential difference between both ends of the capacitor 901 becomes equal to the amplitude of the common voltage Vcom. At this time, the voltage VgoffH is disconnected by the voltage selector 902. However, since the voltage selector 111 selects and outputs the voltage VgoffL, this will involves no problem. Next, when the A.C. signal M becomes at its high level and has a negative polarity, the voltage selectors 110 and 111 select and output the voltage VcomH and voltage VgoffH respectively. At this time, the voltage selector 902 connects the plus electrode of the capacitor 901 with the voltage VgoffH, and the voltage selector 903 connects the minus electrode of the capacitor 901 with the voltage VgoffL. Accordingly, the voltage VgoffH can be made high by an amount corresponding to the amplitude of the common voltage Vcom from the voltage VgoffL, and therefore the gate-off voltage Vgoff can be a voltage that is in phase with the common voltage Vcom and has the same amplitude thereas.

As has been explained in the foregoing, the capacitor can be used to easily generate the common voltage Vcom and gate-off voltage Vgoff in phase with each other and having the same amplitude. The capacitor 901 may be formed as an externally-provided part of an IC. However, when the load capacity of a gate line is small, the capacitive value of the capacitor 901 can also be made small and thus can be formed even into the IC.

Embodiment 5:

A liquid crystal display apparatus including a power supply device in accordance with a fifth embodiment of the present invention will be explained with reference to FIGS. 10 to 12.

Figure 10:
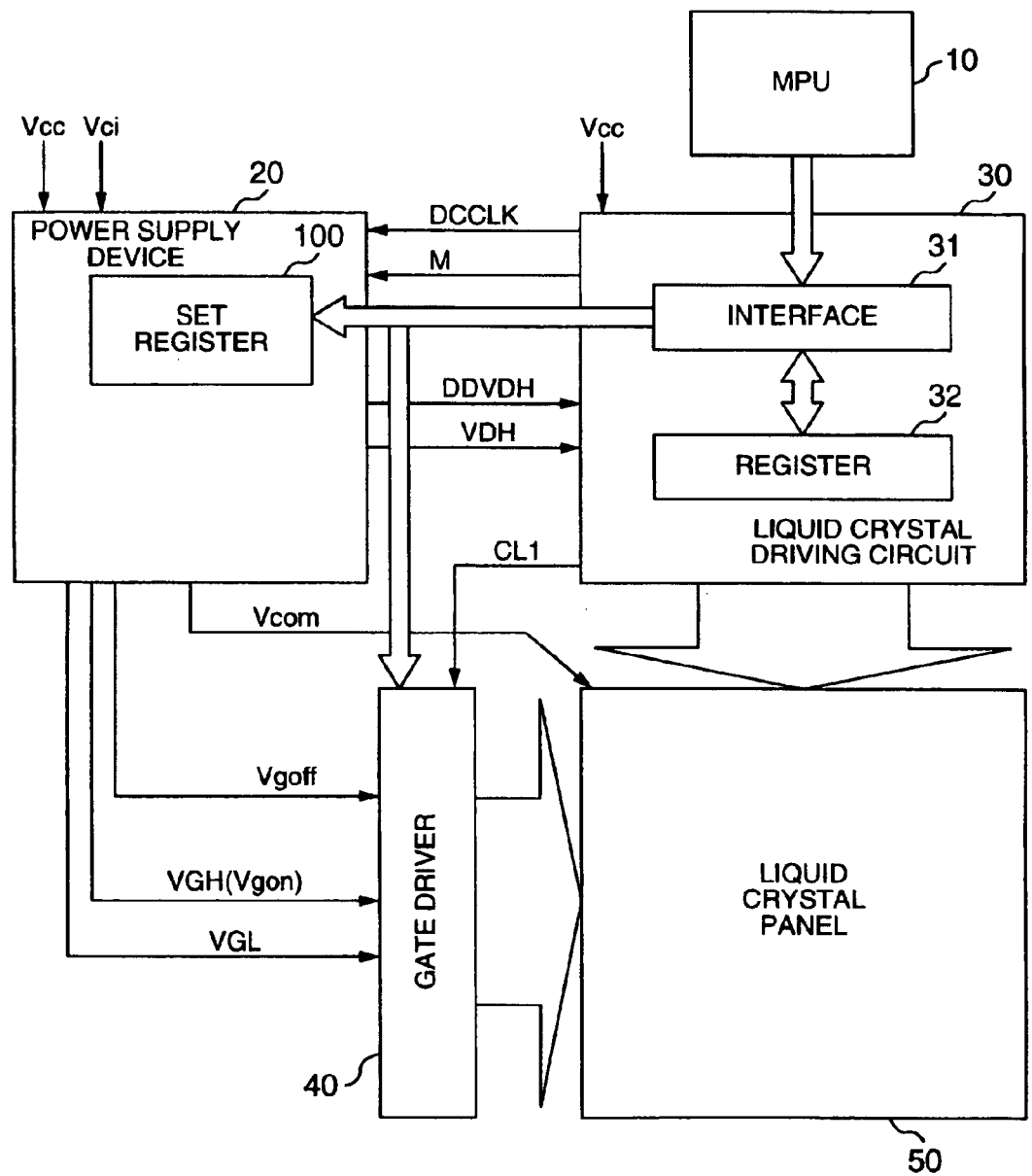
FIG. 10 schematically shows an arrangement of a liquid crystal display apparatus including a power supply device in accordance with a fifth embodiment of the present invention.

FIG. 10 schematically shows an arrangement of the liquid crystal display apparatus including the power supply device of the present embodiment. In FIG. 10, the liquid crystal display apparatus includes a microprocessor (which will be referred merely as the MPU, hereinafter) 10, a power supply device 20, a liquid crystal driving circuit 30 for generating a gray scale voltage according to display data specified by the MPU 10, a scanning circuit 40 for selecting pixels to which the gray scale voltage is applied in units of line, and a liquid crystal panel 50 having a plurality of pixels arranged in a matrix shape. The liquid crystal driving circuit 30 has an interface 31 for receiving set data from the MPU 10 and a register 32 for holding the set data herein. The set register 100 corresponds to one of the power supply devices of the first to fourth embodiments.

Explanation will next be made as to the operation of the liquid crystal display apparatus including the power supply device of the present embodiment. After the power of the apparatus is turned ON, the MPU 10 outputs an instruction for setting of the respective circuits to the liquid crystal driving circuit 30. The liquid crystal driving circuit 30, when receiving the instruction at the interface 31, holds it in the register 32. Among set values held in the register 32, the set values of the power supply device 20 and scanning circuit 40 are output to the associated device and circuit under control of the instruction from the MPU 10. The liquid crystal driving circuit 30 is used also as an interface with the MPU 10. The power supply device 20 is an analog circuit. The interface 31 receives a serial signal.

Figure 11:
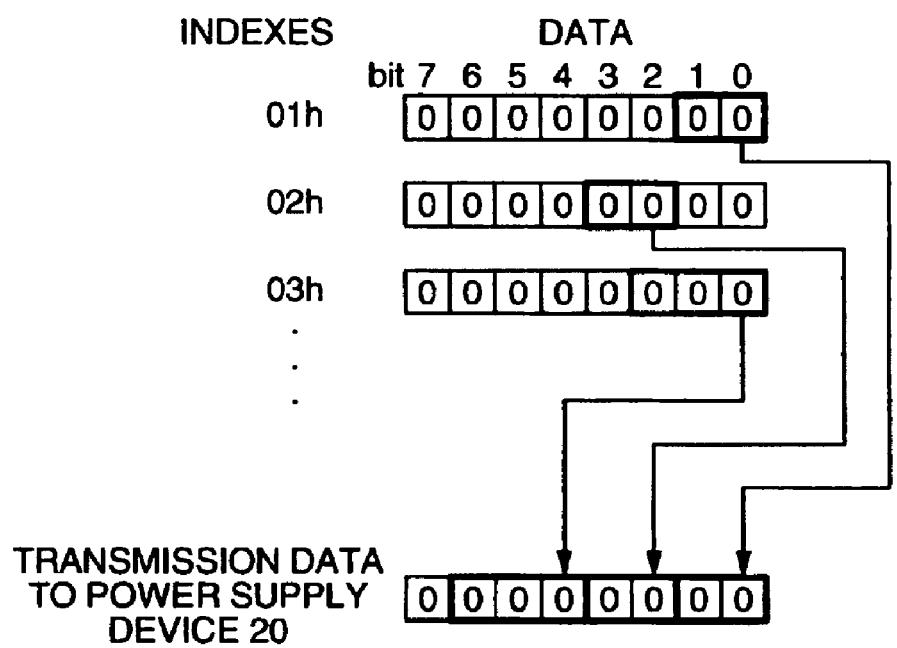
FIG. 11 is a diagram for explaining how to transmit set data in the liquid crystal display apparatus including the power supply device in accordance with the fifth embodiment of the invention.

How to transmit the set value of the power supply device 20 from the liquid crystal driving circuit 30 will be detailed with use of FIG. 11. Indexes of data to be written are first sent from the MPU 10 and then the data are written into the register 32 for each index. Assuming that the set value of the power supply device 20 consists of bits 1 to 0 in an index 01h, bits 3 to 2 in an index o2h and bit 2 of 0 in an index 03h in the data sent from the MPU 10, then the liquid crystal driving circuit 30 at the time point of receiving the transmission command from the MPU 10, combines and transmits the above bits to the power supply device 20. Similarly the set value can be transmitted even to the scanning circuit 40. Accordingly when the interface with the MPU 10 is combined into the liquid crystal driving circuit 30, the circuit scale of the power supply device 20 and scanning circuit 40 can be reduced.

As shown in FIG. 10, the set value transmitted from the liquid crystal driving circuit 30, in particular, to the power supply device 20, is held in the set register 100. When the MPU 10 outputs the set value of each circuit to the liquid crystal driving circuit 30 in this way, the liquid crystal driving circuit 30 can output only necessary data to the power supply device 20 and scanning circuit 40 to determine the operations of the respective circuits.

The liquid crystal driving circuit 30 plays a role of a controller outputting a control signal. The liquid crystal driving circuit 30 generates and outputs a boosting clock DCCLK and an A.C. signal M to the MPU 10. The power supply device 20 takes the set value from the liquid crystal driving circuit 30 into the set register 100 to set each voltage at its each internal point. The scanning circuit 40 similarly takes the set value to set each voltage in its each internal point. The power supply device 20 boosts a reference power Vci based on the boosting clock DCCLK according to the set value of the set register, and generates each voltage for each point. The power supply device 20 also outputs a power supply voltage DDVDH for gray scale voltage and a gray scale reference voltage VDH to the liquid crystal driving circuit 30. The power supply device 20 further outputs a positive high voltage power VGH (which becomes a gate-on voltage Vgon), a negative high voltage power VGL and a gate-off voltage Vgoff to the scanning circuit 40. The power supply device 20 also outputs a common voltage Vcom of the liquid crystal panel 50 to the liquid crystal panel 50.

Next, after the power becomes stable, the MPU 10 outputs display data to the liquid crystal driving circuit 30. The liquid crystal driving circuit 30 has a gray scale voltage generator (not shown) powered by the power supply voltage DDVDH for the gray scale voltage, which generator generates each gray scale voltage level from the gray scale reference voltage VDH, converts it to each gray scale voltage according to the display data, and outputs it to an associated data line of the liquid crystal panel 50.

The scanning circuit 40, which is powered by the positive high voltage power VGH and negative power voltage VGL, outputs the gate-off voltage Vgoff during a non-selecting period according to a line clock CL1 received from the liquid crystal driving circuit 30, and scans the gate line of the liquid crystal panel 50 during a selecting period with use of the positive high voltage power VGH as its scanning voltage. Accordingly the data is displayed on the liquid crystal panel 50.

Figure 12:
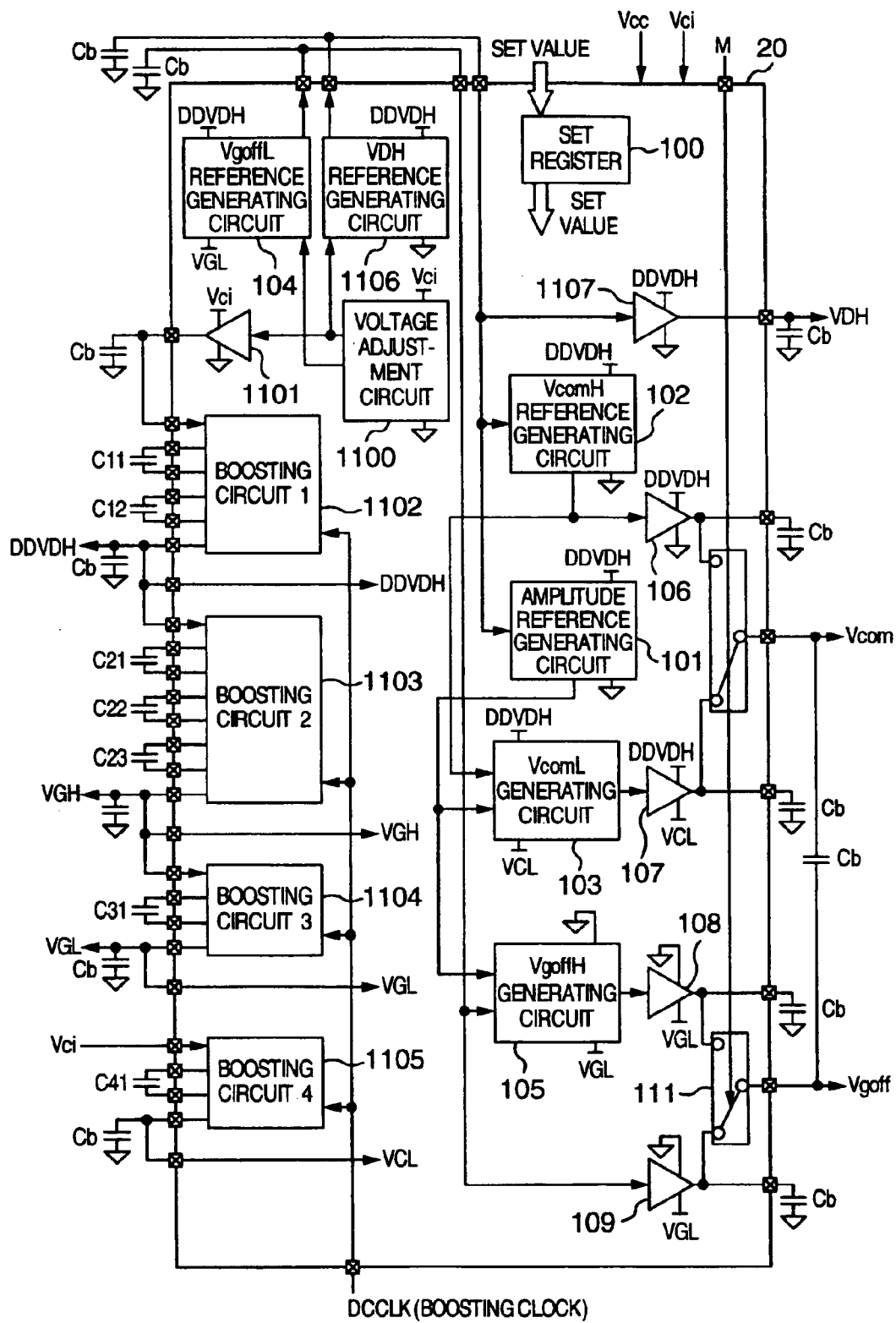
FIG. 12 shows a detailed arrangement of the power supply device in accordance with the fifth embodiment of the invention.

The interior structure of the power supply device 20 will be detailed with use of FIG. 12. In FIG. 12, the power supply device 20 includes, in addition to the elements 100 to 111 of the power supply device of the first embodiments, a voltage adjustment circuit 1100, boosting circuits 1102 to 1105, a VDH reference generating circuit 1106, a buffer 1107, and boosting capacitors C11, C12, C21, C22, C23, C31 and C32. In this connection, each voltage output terminal is provided with a capacitor Cb for stabilization.

Explanation will then be made as to the operation of each of the constituent elements of the power supply device 20. First, the voltage adjustment circuit 1100 generates and outputs a reference voltage VregP and a reference voltage VregN from the reference power Vci. The reference voltage VregP and a reference voltage VregN perform the same function as the reference voltage Vreg of the power supply device of the first embodiment. A regulator 1101 regulates the reference power Vci with the reference voltage VregP and supplies a stable voltage Vci1. A boosting circuit 1102, which is a charge-pump circuit, boosts the voltage Vci1 to twice or triple with use of the boosting capacitors C11 and C12, and outputs it as the power supply voltage DDVDH. A boosting circuit 1103, which is also a charge-pump circuit, boosts the power supply voltage DDVDH to twice, triple or four times with use of the boosting capacitors C21, C22 and C23, and outputs it as the positive high voltage power VGH. A boosting circuit 1104, which is also a charge-pump circuit, boosts the voltage VGH to −1 times with use of the boosting capacitor C31 and outputs it as the power supply voltage DDVDH. A boosting circuit 1105, which is also a charge-pump circuit, boosts the reference voltage Vci to −1 times with use of the boosting capacitor C41 and outputs it as the power supply voltage VCL. The VDH reference generating circuit 1106 voltage-amplifies a voltage from the reference voltage VregP according to the set value. The amplified voltage is current-amplified by the buffer 1107, from which the amplified voltage is output as the voltage VDH. Reference numerals 104 to 111 denote circuits which have the same functions as those in the power supply device of the first embodiment and which are powered by power supply voltages generated by the boosting circuits 1102 to 1105. Thus, various levels of power supply voltages are generated from the stable voltage Vci1, the common voltage Vcom and gate-off voltage Vgoff are generated and supplied to the liquid crystal driving circuit 30, scanning circuit 40 and liquid crystal panel 50 for display.

As has been explained in the foregoing, the common voltage Vcom and gate-off voltage Vgoff in phase with each other and having the same amplitude can be easily generated with use of the set values of the amplitude reference generating circuit, VcomH reference generating circuit and VgoffL reference generating circuit. Further, when set data is updated by the MPU 10, the voltage level and amplitude can be easily changed.

The present invention is not limited to the embodiments shown in the above but may be modified in various ways without departing the subject matter of the invention. For example, although the reference voltage Vreg has been used for the amplitude reference generating circuit 101, VcomH reference generating circuit 102 and VgoffH generating circuit 105 as a common voltage, different voltage levels may be used for these circuits without involving any problem.

According to the first to fifth embodiments of the present invention, there is realized a power supply device and a liquid crystal driving circuit which can suppress the stationary current to reduce its power consumption, can easily change the amplitude or voltage level of the common voltage Vcom and gate-off voltage Vgoff with a good convenience and low cost.

According to the present invention, the stationary current of the liquid crystal display apparatus can be suppressed, whereby the power consumption can be advantageously reduced.

In accordance with the present invention, further, since the amplitude and voltage level of the common voltage Vcom and gate-off voltage Vgoff can be easily changed, user's convenience can be advantageously improved.

It should be further understood by those skilled in the art that the foregoing description has been made on embodiments of the invention and that various changes and modifications may be made in the invention without departing from the spirit of the invention and the scope of the appended claims.

What is claimed is:

1. A display apparatus comprising:
   a display panel having a plurality of pixel parts arranged in a matrix, each pixel part including a pixel electrode connected to a data line and a scan line, and a common electrode opposed to said pixel electrode;
   a data driver for applying a gray scale voltage corresponding to display data to the pixel electrode of the pixel part, via the data line;
   a gate driver for applying a gate-on voltage and a gate-off voltage to the pixel electrode of the pixel part, via the scan line; and
   a power supply device for generating a reference voltage for the gray scale voltage, the gate-on voltage and the gate-off voltage, and a common voltage for the common electrode,
   wherein the power supply device includes a holding circuit for holding an electric charge corresponding to the common voltage, and the gate-off voltage is generated from the electric charge held in the holding circuit.

2. A display apparatus according to claim 1, wherein the power supply device further comprises:
   a first generating circuit for generating the common voltage; and
   a second generating circuit for generating the gate-off voltage from the electric charge held in the holding circuit.

3. A display apparatus according to claim 2, wherein the power supply device further comprises:
   a voltage switching circuit for switching connection of the holding circuit between the first generating circuit and the second generating circuit.

4. A display apparatus according to claim 3, wherein:
   the common voltage includes a first common voltage and a second common voltage different from the first common voltage,
   the gate-off voltage includes a first gate-off voltage and a second gate-off voltage different from the first gate-off voltage,
   a first switching circuit provided to switch between the first common voltage and the second common voltage to output a selected common voltage; and a second switching circuit provided to switch between the first gate-off voltage and the second gate-off voltage to output a selected gate-off voltage; the second switching circuit selecting the first gate-off voltage when the first switching circuit selects the first common voltage, and selecting the second gate-off voltage when the first switching circuit selects the second common voltage.

5. A display apparatus according to claim 4, wherein the voltage switching circuit the holding circuit with the first generating circuit, when the first switching circuit selects the first common voltage, and connects the holding circuit with the second generating circuit when the first switching circuit selects the second common voltage.

6. A display apparatus according to claim 1, wherein:
   the common voltage includes a first common voltage and a second common voltage different from the first common voltage,
   the gate-off voltage includes a first gate-off voltage and a second gate-off voltage different from the first gate-off voltage, and the holding circuits holds an electric charge corresponding to a voltage difference between the first common voltage and the second common voltage as the electric charge corresponding to the common voltage.

7. A display apparatus comprising:
a display panel having a plurality of pixel parts arranged in a matrix, each pixel part including a pixel electrode connected to a data line and a scan line, and a common electrode opposed to the pixel electrode;
a data driver for applying a gray scale voltage corresponding to display data to the pixel electrode of the pixel part, via the data line;
a gate driver for applying a gate-on voltage and a gate-off voltage to the pixel electrode of the pixel part, via the scan line; and
a power supply device for generating a reference voltage for the gray scale voltage, the gate-on voltage and the gate-off voltage, and a common voltage for the common electrode,
wherein the power supply device includes a capacitor for holding an electric charge corresponding to the common voltage, and a selector for selecting between the charge of the capacitor and the discharge of the capacitor depending on a polarity of the pixel part.

8. A display apparatus according to claim 7, wherein the selector selects between the charge of the capacitor and the discharge of the capacitor according to an alternative current signal for changing the polarity of the pixel part.

9. A display apparatus according to claim 7, wherein:
the common voltage includes a first common voltage and a second common voltage different from the first common voltage,
the gate-off voltage includes a first gate-off voltage and a second gate-off voltage different from the first gate-off voltage, and
the selector selects the charge of the capacitor when the power supply device outputs the first common voltage and the first gate-off voltage, and selects the discharge of the capacitor when the power supply device outputs the second common voltage and the second gate-off voltage.

10. A display apparatus comprising:
a display panel having a plurality of pixel parts arranged in a matrix, each pixel part including a pixel electrode connected to a data line and a scan line, and a common electrode opposed to the pixel electrode;
a data driver for applying a gray scale voltage corresponding to display data to the pixel electrode of the pixel part, via the data line;
a gate driver for applying a gate voltage for scanning the pixel parts, to the pixel electrode of the pixel part, via the scan line; and
a power supply device for generating a reference voltage for the gray scale voltage, the gate voltage, and a common voltage for the common electrode,
wherein the power supply device includes a capacitor for holding an electric charge corresponding to the common voltage, and the gate voltage is generated from the common voltage held in the capacitor.

11. A display apparatus according to claim 10, wherein:
the common voltage includes a first common voltage and a second common voltage different from the first common voltage,
the gate-off voltage includes a first gate voltage and a second gate voltage different from the first gate-off voltage, and the capacitor is charged by the common voltage when the power supply device outputs the first common voltage and the first gate-off voltage, and is discharged by the gate-off voltage when the power supply device outputs the second common voltage and the second gate-off voltage.

12. A display apparatus comprising:
a display panel;
a data driver for applying a gray scale voltage corresponding to display data to the display panel, via a data line;
a gate driver for applying a gate-on voltage and a gate-off voltage to the display panel via a scan line; and
a power supply device for generating a reference voltage for the gray scale voltage, the gate-on voltage and the gate-off voltage, and a common voltage for a common electrode,
wherein the power supply device includes a holding circuit for holding an electric charge corresponding to the common voltage, and the gate-off voltage is generated from the electric charge held in the holding circuit.

13. A display apparatus according to claim 12, wherein the power supply device further comprises:
a first generating circuit for generating the common voltage; and
a second generating circuit for generating the gate-off voltage from the electric charge held in the holding circuit.

14. A display apparatus according to claim 13, wherein the power supply device further comprises:
a voltage switching circuit for switching connection of the holding circuit between the first generating circuit and the second generating circuit.

15. A display apparatus according to claim 14, wherein:
the common voltage includes a first common voltage and a second common voltage different from the first common voltage,
the gate-off voltage includes a first gate-off voltage and a second gate-off voltage different from the first gate-off voltage,
a first switching circuit provided to switch between the first common voltage and the second common voltage to output a selected common voltage; and a second switching circuit provided to switch between the first gate-off voltage and the second gate-off voltage to output a selected gate-off voltage; the second switching circuit selecting the first gate-off voltage when the first switching circuit selects the first common voltage, and selecting the second gate-off voltage when the first switching circuit selects the second common voltage.

16. A display apparatus according to claim 15, wherein the voltage switching circuit the holding circuit with the first generating circuit, when the first switching circuit selects the first common voltage, and connects the holding circuit with the second generating circuit when the first switching circuit selects the second common voltage.

17. A display apparatus according to claim 12, wherein:
the common voltage includes a first common voltage and a second common voltage different from the first common voltage,
the gate-off voltage includes a first gate-off voltage and a second gate-off voltage different from the first gate-off voltage, and
the holding circuits holds an electric charge corresponding to a voltage difference between the first common voltage and the second common voltage as the electric charge corresponding to the common voltage.

18. A display apparatus comprising:

a display panel;

a data driver for applying a gray scale voltage corresponding to display data to the display panel, via a data line;

a gate driver for applying a gate-on voltage and a gate-off voltage to the display panel, via a scan line; and a power supply device for generating a reference voltage for the gray scale voltage, the gate-on voltage and the gate-off voltage, and a common voltage for a common electrode, wherein the power supply device includes a capacitor for holding an electric charge corresponding to the common voltage, and a selector for selecting between the charge of the capacitor and the discharge of the capacitor depending on a polarity of the display panel.

19. A display apparatus according to claim 18, wherein the selector selects between the charge of the capacitor and the discharge of the capacitor according to an alternative current signal for changing the polarity of the display panel.

20. A display apparatus according to claim 18, wherein:

the common voltage includes a first common voltage and a second common voltage different from the first common voltage, the gate-off voltage includes a first gate-off voltage and a second gate-off voltage different from the first gate-off voltage, and the selector selects the charge of the capacitor when the power supply device outputs the first common voltage and the first gate-off voltage, and selects the discharge of the capacitor when the power supply device outputs the second common voltage and the second gate-off voltage.

21. A display apparatus comprising:

a display panel;

a data driver for applying a gray scale voltage corresponding to display data to the display panel, via a data line;

a gate driver for applying a gate voltage, to the display panel, via a scan line; and a power supply device for generating a reference voltage for the gray scale voltage, the gate voltage, and a common voltage for a common electrode, wherein the power supply device includes a capacitor for holding an electric charge corresponding to the common voltage, and the gate voltage is generated from the common voltage held in the capacitor.

22. A display apparatus according to claim 21, wherein:

the common voltage includes a first common voltage and a second common voltage different from the first common voltage, the gate-off voltage includes a first gate voltage and a second gate voltage different from the first gate-off voltage, and the capacitor is charged by the common voltage when the power supply device outputs the first common voltage and the first gate-off voltage, and is discharged by the gate-off voltage when the power supply device outputs the second common voltage and the second gate-off voltage.

* * * * *